US009293251B2

(12) United States Patent
Irie et al.

(10) Patent No.: US 9,293,251 B2
(45) Date of Patent: Mar. 22, 2016

(54) METHOD OF EXCITING PRIMARY COILS IN CONTACTLESS POWER SUPPLYING DEVICE AND CONTACTLESS POWER SUPPLYING DEVICE

(71) Applicant: Panasonic Corporation, Osaka (JP)

(72) Inventors: Kenichi Irie, Osaka (JP); Satoshi Hyodo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 659 days.

(21) Appl. No.: 13/649,164

(22) Filed: Oct. 11, 2012

(65) Prior Publication Data

US 2014/0103730 A1    Apr. 17, 2014

(51) Int. Cl.
H01F 38/14 (2006.01)
H02J 5/00 (2006.01)
H04B 5/00 (2006.01)

(52) U.S. Cl.
CPC ............... *H01F 38/14* (2013.01); *H02J 5/005* (2013.01); *H04B 5/0037* (2013.01); *H04B 5/0087* (2013.01); *H04B 5/0093* (2013.01)

(58) Field of Classification Search
CPC ............ H02J 5/005; H02J 7/025; H01F 38/14
USPC ........................................................ 307/104
See application file for complete search history.

(56) References Cited

U.S. PATENT DOCUMENTS

| 7,893,564 | B2 | 2/2011 | Bennett | |
| 7,952,322 | B2* | 5/2011 | Partovi et al. | 320/108 |
| 8,060,011 | B2* | 11/2011 | Jin | 455/41.1 |
| 8,800,738 | B2* | 8/2014 | Urano | 191/10 |
| 2007/0145830 | A1 | 6/2007 | Lee et al. | |
| 2010/0090717 | A1* | 4/2010 | Steedman et al. | 324/763 |
| 2010/0244767 | A1 | 9/2010 | Turner et al. | |
| 2010/0259217 | A1 | 10/2010 | Baarman | |

(Continued)

FOREIGN PATENT DOCUMENTS

| JP | 11-308146 A | 11/1999 |
| JP | 2005-339507 A | 12/2005 |

(Continued)

OTHER PUBLICATIONS

German Office Action for corresponding German Application No. 10 2012 020 364.0 dated Jun. 25, 2013 with English translation.

(Continued)

*Primary Examiner* — Rexford Barnie
*Assistant Examiner* — Daniel Kessie
(74) *Attorney, Agent, or Firm* — Renner, Otto, Boisselle & Sklar, LLP

(57) ABSTRACT

A contactless power supplying device includes a plurality of unit controllers that control a plurality of groups of power supplying unit circuits, which respectively excite a plurality of groups of primary coils. A clock signal generation circuit provides the plurality of unit controllers with a common clock signal. The plurality of unit controllers generates synchronization signals to excite the plurality of groups of primary coils in accordance with a common clock signal and provides the synchronization signals respectively to a plurality of power supplying unit circuit. The synchronization signals are rectangular wave pulses having the same cycle, and the plurality of groups of primary coils are excited with the same frequency.

3 Claims, 9 Drawing Sheets

(56) References Cited

U.S. PATENT DOCUMENTS

| | | | |
|---|---|---|---|
| 2010/0270867 A1* | 10/2010 | Abe | 307/104 |
| 2010/0308939 A1* | 12/2010 | Kurs | 333/219.2 |
| 2012/0098485 A1 | 4/2012 | Kang et al. | |
| 2012/0235637 A1* | 9/2012 | Tanabe | 320/108 |
| 2013/0015705 A1 | 1/2013 | Abe | |
| 2013/0099592 A1 | 4/2013 | Abe | |

FOREIGN PATENT DOCUMENTS

| | | |
|---|---|---|
| JP | 4639773 B2 | 12/2010 |
| JP | 2011-045236 A | 3/2011 |
| JP | 2012-105477 A | 5/2012 |
| KR | 10-0976319 B1 | 8/2010 |
| TW | 201101643 A1 | 1/2011 |
| TW | 201208225 A1 | 2/2012 |
| WO | WO 2011/122348 A1 | 10/2011 |

OTHER PUBLICATIONS

Taiwanese Office Action for corresponding Taiwanese Application No. 101137903, dated May 2, 2014, and English translation of search report.
Korean Office Action for corresponding Korean Application No. 10-2012-0117348 dated Jan. 27, 2014.
Japanese Office Action for corresponding Japanese Application No. 2011-129227, dated Dec. 9, 2014.

* cited by examiner

METHOD OF EXCITING PRIMARY COILS IN CONTACTLESS POWER SUPPLYING DEVICE AND CONTACTLESS POWER SUPPLYING DEVICE

TECHNICAL FIELD

The present invention relates to a method for exciting primary coils in a contactless power supplying device and a contactless power supplying device.

BACKGROUND ART

Various contactless power supplying systems that use contactless power supplying techniques have been proposed over these recent years. In particular, contactless power supplying systems that use electromagnetic induction have become practical.

In an electromagnetic contactless power supplying system, a contactless power supplying device includes a plurality of primary coils arranged in parallel to a setting surface on which an electric appliance is set. The electric appliance, which is supplied with power in a contactless manner from the contactless power supplying device, includes a power reception device. A secondary coil is arranged in the power reception device.

In Japanese Patent No. 4639773, when the electric appliance is set on the setting surface of the contactless power supplying device, among the primary coils arranged in the contactless power supplying device, the primary coil opposing the secondary coil, which is arranged in a power reception device of the electric appliance, is selected. The selected primary coil is excited and driven to supply the secondary coil with secondary power.

In the contactless power supplying device of Japanese Patent No. 4639773, a single oscillation circuit (resonance circuit) is used to drive the primary coils. The resonance circuit is connected to each primary coil to excite and drive the primary coil. Accordingly, the excitation frequency is the same for each primary coil.

SUMMARY OF THE INVENTION

A contactless power supplying system is used in a wide variety of applications, and the number of primary coils in a single contactless power supplying device has tended to increase. Further, a plurality of contactless power supplying device may be used in combination.

When the number of primary coils for a single contactless power supplying device increases, the load increases. Thus, the contactless power supplying device requires a plurality of oscillation circuits. In a contactless power supplying device that uses a plurality of oscillation circuits, selected primary coils may be connected to different oscillation circuits when excited and driven.

In this case, differences in circuit elements between oscillation circuits and differences in the ambient temperature may result in variations in the excitation frequency and amplitude of the selected primary coil. The variation leads to variations in the secondary power supplied to the secondary coils. This makes it difficult to supply stable secondary power.

To stabilize the secondary power, a smoothing capacitor having a large capacitance may be arranged in the power reception device. However, a smoothing capacitor having a large capacitance is expensive and increases costs. Further, a smoothing capacitor is large and thereby enlarges the power reception device. In the power reception device, a constant voltage power supply circuit, such as a three-terminal regulator, may be used. However, this would increase power loss during rectification and lower the power supplying efficiency.

Such a problem also occurs when combining a plurality of contactless power supplying devices to supply power to the power supplying device of a single electric appliance.

It is an object of the present invention to suppress variations in the excitation frequency of power supplying primary coils and provide a method for exciting primary coils of a contactless power supplying device and a contactless power supplying device that improve the power supplying efficiency.

One aspect is a method for exciting a primary coil in a contactless power supplying device that includes a plurality of primary coils and a plurality of power supplying unit circuits respectively exciting the plurality of primary coils. The contactless power supplying device uses an electromagnetic induction effect to supply power to a power reception device opposed to at least one of the primary coils. The method includes dividing the plurality of primary coils into a plurality of groups of primary coils, and providing synchronization signals to power supplying circuits in each group among a plurality of groups of power supplying unit circuits respectively corresponding to the plurality of groups of primary coils. The providing synchronization signals includes providing the plurality of groups of power supplying unit circuits with synchronization signals that have the same frequency to excite and drive the plurality of groups of primary coils with the same frequency.

A further aspect is a contactless power supplying device including a plurality of groups of primary coils and a plurality of groups of power supplying unit circuits that respectively excite the plurality of groups of primary coils. The contactless power supplying device uses an electromagnetic induction effect to supply power to a power reception device opposed to at least one of the primary coils among the plurality of groups of primary coils. The contactless power supplying device includes a plurality of unit controllers that respectively provide synchronization signals to the plurality of groups of power supplying units. The synchronization signals generated by the plurality of unit controllers have the same frequency.

The contactless power supplying device may include a clock signal generation circuit connected to the plurality of unit controllers to provide each of the plurality of unit controllers with a common clock signal, which is used by the plurality of unit controllers to generate the synchronization signals that have the same frequency.

Further, one unit controller among the plurality of unit controllers may include the clock signal generation circuit, and the clock signal generated by the clock signal generation circuit may be provided to the other unit controllers.

In another aspect, a contactless power supplying device includes a plurality of groups of primary coils and a plurality of groups of power supplying unit circuits that respectively excite the plurality of groups of primary coils. The contactless power supplying device uses an electromagnetic induction effect to supply power to a power reception device opposed to at least one of the primary coils among the plurality of groups of primary coils. The contactless power supplying device includes a plurality of unit controllers that respectively provide synchronization signals to the plurality of groups of power supplying units. A frequency comparison circuit is connected to the plurality of unit controllers. The frequency comparison circuit compares frequencies of the plurality of synchronization signals generated by the plurality of unit controllers and provides a plurality of control signals to the plurality of unit controllers so that the plurality of synchronization signals have the same frequency.

The frequency comparison circuit may include a sampling circuit, which samples the plurality of synchronization signals generated by the plurality of unit controllers, and a control circuit connected to the sampling circuit. The control calculates the frequency of each of the plurality of synchronization signals generated by the plurality of unit controllers based on a sampling signal sampled by the sampling circuit, uses the calculated frequency of one synchronization signal among the plurality of synchronization signals as a reference, and provides the unit controllers corresponding to the remaining synchronization signals with a control signal so that the remaining synchronization signals are generated with frequencies that conform to the one synchronization signal.

EMBODIMENTS OF THE INVENTION (First Embodiment)
A first embodiment of the present invention will now be described with reference to the drawings.

Figure 1:
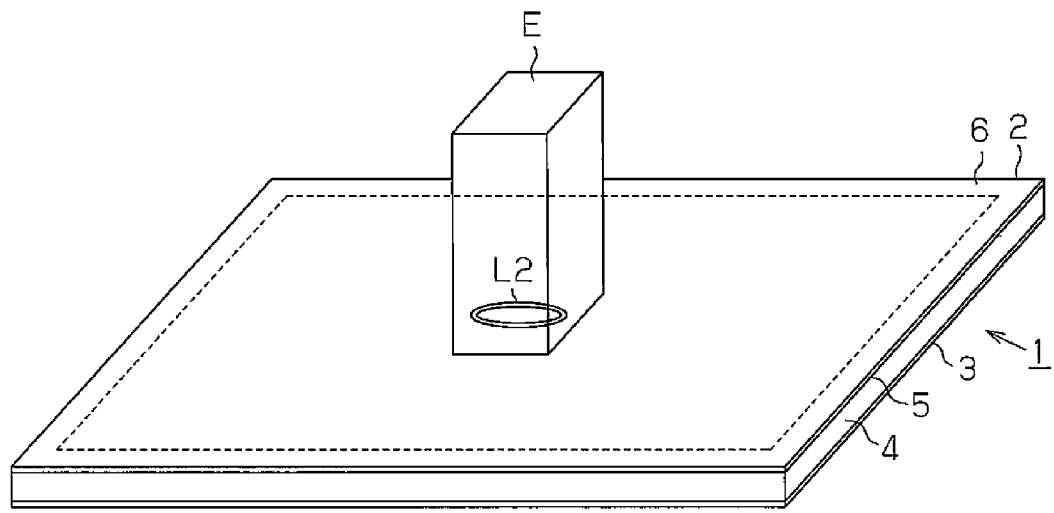
FIG. 1 is a perspective view entirely showing a state in which an appliance is set on a power supplying device of a first embodiment.

FIG. 1 is a perspective view entirely showing a contactless power supplying device (hereinafter, simply referred to as the power supplying device) 1 and an electric appliance (hereinafter, simply referred to as the appliance) E, which is supplied with power from the power supplying device 1.

The power supplying device 1 includes a frame 2, which has a tetragonal bottom plate 3. Side plates 4 extend upward from the four sides of the bottom plate. A top plate 5, which is formed by a reinforced glass, closes an upper opening formed by the side plates 4. The top plate 5 has an upper surface that defines a setting surface 6 on which the appliance E is set.

Figure 2:
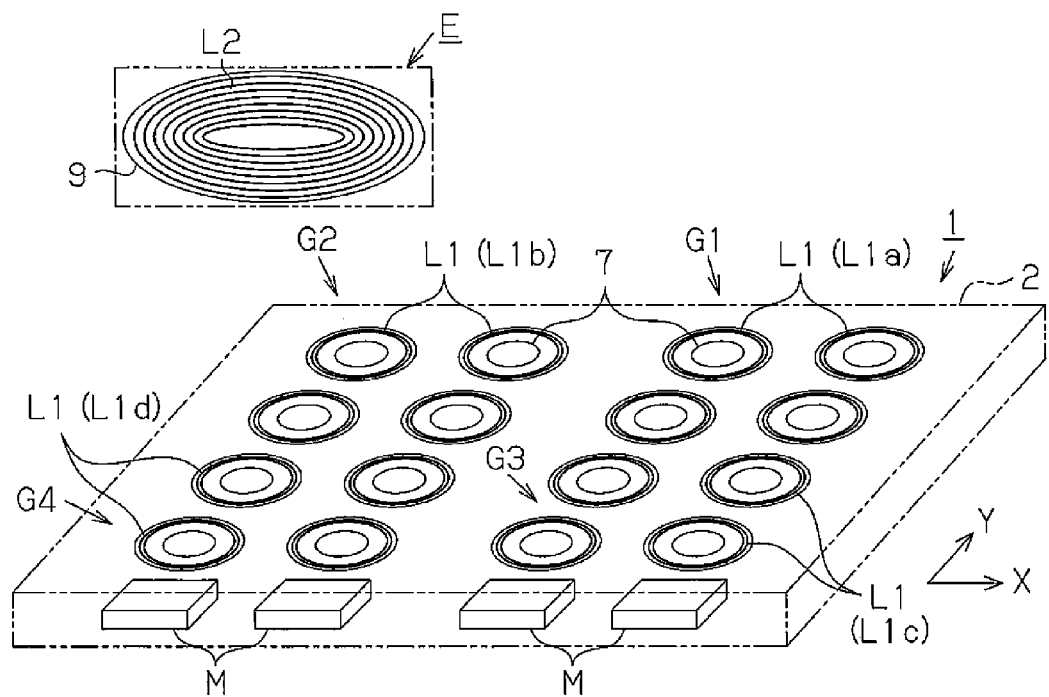
FIG. 2 is a diagram showing the array of primary coils.

As shown in FIG. 2, the top plate 5 includes a rear surface on which a plurality of primary coils L1 are arranged. In the present embodiment, there are sixteen primary coils L1 arranged parallel to the setting surface 6 of the top plate 5, with four arranged in the X direction and four arranged in the Y direction.

As shown in FIG. 2, the bottom plate 3, the side plates 4, and the top plate 5 define a void (in the frame 2) that accommodates power supplying unit circuits M (only some shown) respectively connected to the primary coils L1. The power supplying unit circuits M are electrically connected to the corresponding primary coils L1 to excite and drive the corresponding primary coils L1. Each primary coil L1 is excited and driven solely or in cooperation with another primary coil L1 to supply power in a contactless manner to the appliance E set on the setting surface 6.

Further, as shown in FIG. 2, a signal reception antenna 7 is arranged and fixed to the inner side of each primary coil L1. Data and information is exchanged by wireless communication through the signal reception antenna 7 between the appliance E set on the setting surface 6 and the corresponding power supplying unit circuit M.

In the present embodiment, to facilitate description, the sixteen primary coils L1 arranged on the rear surface of the top plate 5 are divided into two in the X direction and two in the Y direction to form groups of four primary coils L1. To distinguish the primary coils of first to fourth groups G1 to G4, the alphabets "a", "b", "c", and "d" are added behind the reference character "L1" in the description hereafter. The four primary coils L1 in the right upper first group G1 are indicated as the primary coils L1a, and the four primary coils L1 in the left upper second group G2 are indicated as the primary coils L1b. The four primary coils L1 in the right lower group G3 are indicated as the primary coils L1c, and the primary coils L1 of the four primary coils L1 in the left lower fourth group G2 are indicated as the primary coils L1d.

The appliance E, which is set on the setting surface 6 of the power supplying device 1, includes a signal transmission antenna 9 arranged at the outer side of the secondary coil L2 and wound to surround the secondary coil L2. When the appliance E is set on the setting surface 6 of the power supplying device 1, data and information are exchanged by wireless communication between the signal transmission antenna 9 of the appliance E and the signal reception antenna 7 surrounding the one of the primary coils L1a to L1d located immediately below the appliance E.

The electric configurations of the power supplying device 1 and the appliance E will now be described with reference to FIG. 3.

(Appliance E)
The appliance E will now be described. As shown in FIG. 3, the appliance E includes a power reception circuit 20, which serves as a power reception device that receives secondary power from the power supplying device 1. As shown in FIG. 4, the power reception circuit 20 includes a rectification smoothing circuit 21, a DC/DC converter circuit 22, a data generation circuit 23, and a transmission circuit 24.

The rectification smoothing circuit 21 is connected to the secondary coil L2. The rectification smoothing circuit 21 converts the secondary power, which is excited and supplied to the secondary coil L2, through electromagnetic induction by exciting the primary coils L1a to L1d of the power supplying device 1 into ripple-free DC voltage. The DC/DC converter circuit 22 DC/DC-converts the DC voltage generated by the rectification smoothing circuit 21 into a desired voltage and supplies a load Z with the DC/DC-converted DC voltage.

The load Z only needs to be a device driven by the secondary power generated by the secondary coil L2. For example, an appliance may drive the load Z on the setting surface 6 using DC/DC-converted DC power. Alternatively, an appliance may drive the load Z on the setting surface 6 directly using the secondary power as AC power. Further, the appliance may charge an incorporated rechargeable battery (secondary battery) using DC/DC-converted DC power.

The DC/DC-converted DC voltage also uses rectified DC power as a drive source for the data generation circuit 23 and the transmission circuit 24.

The data generation circuit 23 outputs an appliance authentication signal ID and an excitation request signal RQ to the transmission circuit 24. The appliance authentication signal ID is sent to the power supplying device 1 to indicate that the appliance E is allowed to be supplied with power by the power supplying device 1. The excitation request signal RQ is sent to the power supplying device 1 to request for power to be supplied.

The data generation circuit 23 generates and outputs to the transmission circuit 24 the appliance authentication signal ID and the excitation request signal RQ when, for example, the rectification smoothing circuit 21 outputs DC power or when the secondary battery or the like incorporated in the appliance E can be driven. Further, the data generation circuit 23 does not generate the appliance authentication signal ID and the excitation request signal RQ when a power switch used to drive, for example, the load Z arranged in the appliance E is OFF, the data generation circuit 23 does not generate the appliance authentication signal ID and the excitation request signal RQ.

When the appliance E includes a microcomputer and the microcomputer determines to suspend the supply of power, the data generation circuit 23 does not generate the appliance authentication signal ID and the excitation request signal RQ.

The transmission circuit 24 is connected to the signal transmission antenna 9. The transmission circuit 24 receives the appliance authentication signal ID and the excitation request signal RQ from the data generation circuit 23 and transmits the appliance authentication signal ID and the excitation request signal RQ through the signal transmission antenna 9.

(Power Supplying Device 1)

Figure 3:
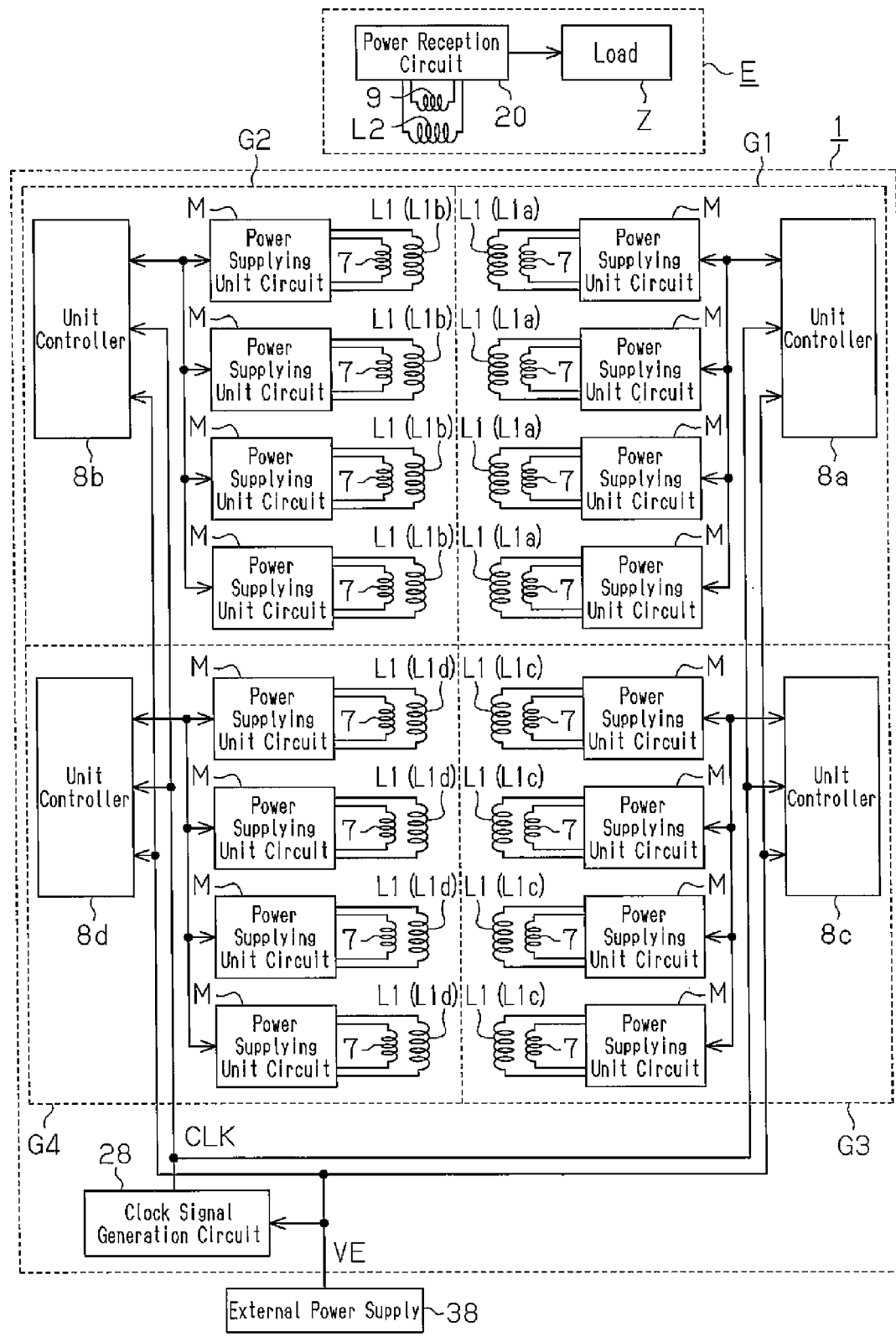
FIG. 3 is an electric block circuit diagram of the power supplying device and the appliance.
Figure 4:
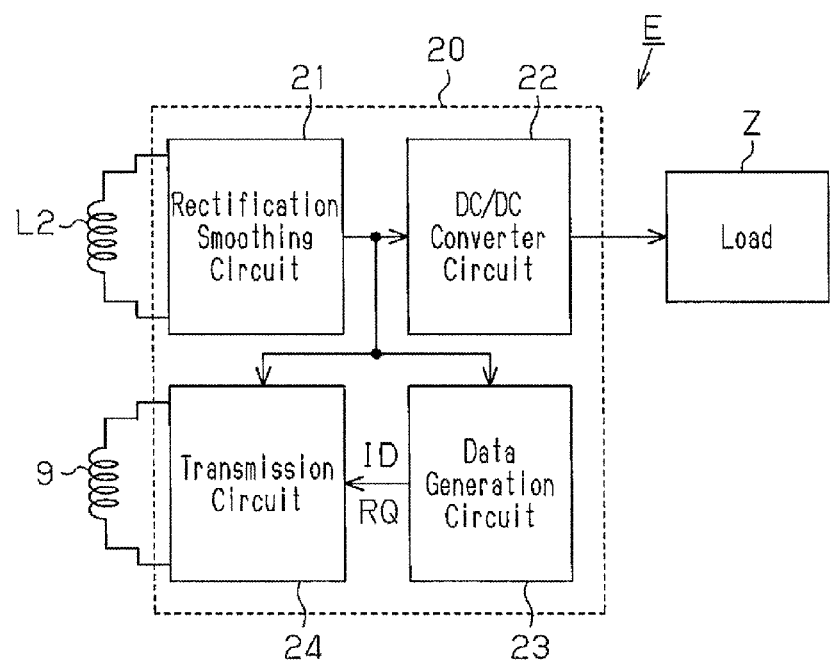
FIG. 4 is an electric block circuit diagram of a power reception device arranged in the appliance.

As shown in FIG. 3, the power supplying device 1 includes a power supplying unit circuit M for each of the primary coils L1a to L1d in each of the groups G1 to G4, unit controllers 8a to 8d respectively provided for the groups, and the clock signal generation circuit 28.

In the power supplying device 1, the power supplying unit circuits M for the primary coils L1a to L1d of each of the groups G1 to G4 and the unit controllers 8a to 8d for each of the groups have the same circuit configuration. Accordingly, to facilitate description, the power supplying unit circuit M for one of the primary coils L1a in the first group G1 and the unit controller 8a that controls all of the power supplying unit circuits M in the first group G1 will be described.

Figure 5:
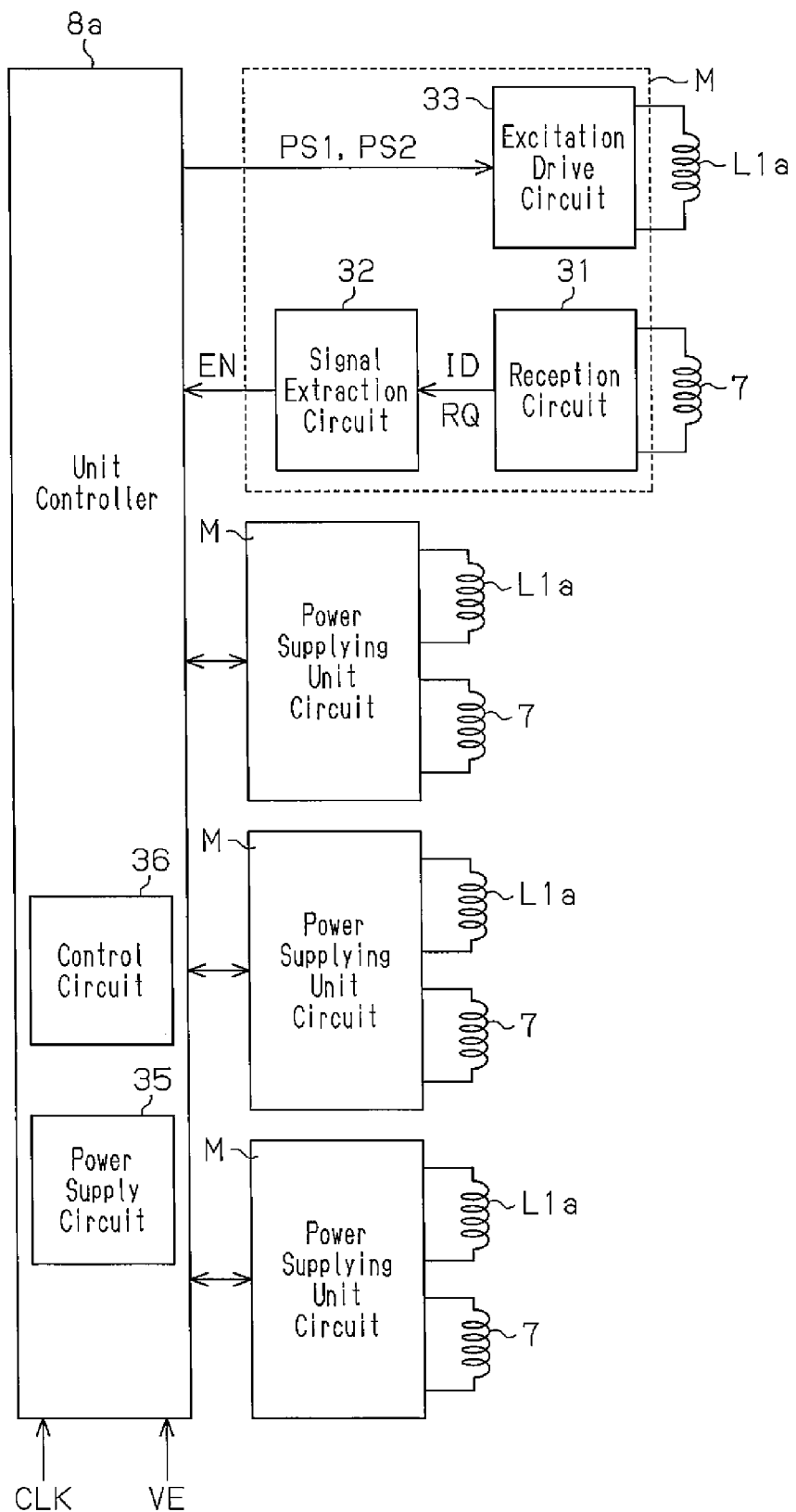
FIG. 5 is an electric circuit diagram showing the electric configuration of part of the power supplying device.

As shown in FIG. 5, the power supplying unit circuit M includes a reception circuit 31, a signal extraction circuit 32, and an excitation drive circuit 33.

The reception circuit 31 is connected to the signal reception antenna 7. The reception circuit 31 receives a transmission signal transmitted from the signal transmission antenna 9 of the appliance E set on the setting surface 6 via the signal reception antenna 7. The reception circuit 31 outputs the received transmission signal to the signal extraction circuit 32.

The signal extraction circuit 32 extracts the appliance authentication signal ID and the excitation request signal RQ from the transmission signal. When extracting the appliance authentication signal ID and the excitation request signal RQ from the transmission signal, the signal extraction circuit 32 outputs a permission signal EN to the unit controller 8a. Here, the signal extraction circuit 32 adds a unit identification signal that identifies its power supplying circuit M to the permission signal EN sent to the unit controller 8a.

When extracting only one of the appliance authentication signal ID and excitation request signal RQ or when none can be extracted, the signal extraction circuit 32 does not output the permission signal EN to the unit controller 8a.

The excitation drive circuit 33 is connected to the primary coil L1a and configures a half bridge circuit with the same primary coil L1 in the present embodiment. Accordingly, the excitation drive circuit 33 includes two switching transistors such as MOS transistors.

Figure 6:
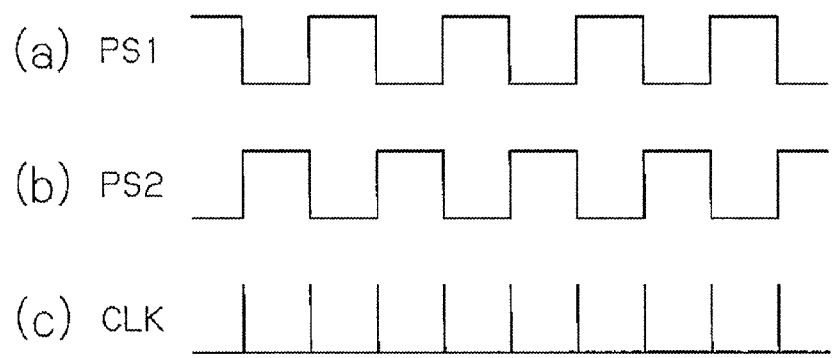
FIG. 6(a) is a waveform chart of one synchronization signal.
FIG. 6(b) is a waveform chart showing another synchronization signal.
FIG. 6(c) is a waveform diagram showing a clock signal.

The gate terminals of the two transistors receive synchronization signals PS1 and PS2 formed by ON and OFF pulse signals shown in FIGS. 6(a) and 6(b) from the unit controller 8a. The synchronization signals PS1 and PS2 input to the gate terminals of the transistors are complementary signals so that when one transistor is ON, the other transistor is OFF.

In detail, when the appliance E is set on the setting surface 6 and the signal extraction circuit 32 is continuously outputting the permission signal EN to the unit controller 8a, the unit controller 8a continuously outputs the synchronization signals PS1 and PS2. Accordingly, in this case, the excitation drive circuit 33 continuously drives and excites the primary coil L1a.

When the appliance E is not set on the setting surface 6, the unit controller 8a intermittently outputs the synchronization signals PS1 and PS2 for a predetermined period. Accordingly, in this case, the excitation drive circuit 33 intermittently excites and drives the primary coil L1a whenever a fixed period elapses.

The intermittent exciting and driving of the primary coil L1a does not generate secondary power that can readily drive the load Z of the appliance E when the appliance E is set on the setting surface 6 but generates secondary power that is just sufficient enough to charge a charger of the load Z. The charging voltage drives the data generation circuit 23 and transmission circuit 24 of the appliance E to perform wireless communication with the appliance E.

Further, when the signal extraction circuit 32 is not outputting the permission signal EN, the excitation drive circuit 33 intermittently excites and drives the primary coil L1a in the same manner as when the appliance E is not set on the setting surface.

As shown in FIG. 5, the unit controller 8a includes a power supply circuit 35 and a control circuit 36, which controls all of the power supplying unit circuits M in the first group.

The power supply circuit 35, which includes a rectification circuit and a DC/DC converter circuit, receives power supply voltage VE from an external power supply 38 (refer to FIG. 3) and rectifies the power supply voltage VE with the rectification circuit. The power supply circuit 35 converts the rectified DC voltage to a desired voltage with the DC/DC converter circuit and then outputs the DC voltage as drive power to the control circuit 36.

The control circuit 36 generates the synchronization signals PS1 and PS2 shown in FIGS. 6(a) and 6(b) output to the excitation drive circuit 33 based on a clock signal CLK from the clock signal generation circuit 28. The control circuit 36 includes a flip-flop circuit and generates one synchronization signal PS1 in synchronization with the clock signal CLK from the clock signal generation circuit 28. The control circuit 36 inverts the synchronization signal PS1 with an inverter circuit and also generates the other synchronization signal PS2.

In the present embodiment, the control circuit 36 generates the synchronization signals PS1 and PS2 but may generate only the synchronization signal PS1, which is output to the excitation drive circuit 33 of each power supply unit circuit M. Further, the other synchronization signal PS2 can be generated from the synchronization signal PS1 in the excitation drive circuit 33 of each power supplying unit circuit M.

The control circuit 36 receives the permission signal EN from the signal extraction circuit 32. Based on the unit identification signal added to the permission signal EN, the control circuit 36 determines which one of the power supplying unit circuit M is outputting the permission signal EN. The control circuit 36 continuously outputs the synchronization signals PS1 and PS2 to the identified power supply unit circuit M and continuously excites and drives the primary coil L1a with the excitation drive circuit 33.

When the appliance E, which can be supplied with power and is requesting for power to be supplied, has a large size and is set on the setting surface 6 of the power supplying device 1, two or more primary coils L1a may be located immediately below the power supplying device 1.

In this case, the power supplying unit circuit M corresponding to each of the primary coils L1a located immediately below the appliance E receives the excitation request signal RQ and appliance authentication signal ID of the appliance E and outputs the permission signal EN to the control circuit 36.

Based on the permission signal EN, to which a module identification signal is added, from each power supply unit circuit M, the control circuit 36 determines whether or not the same appliance E set immediately above the primary coil L1a of each power supplying unit circuit M.

When the appliance E has a large size, it can be determined from the permission signal EN of each power supplying unit circuit M that the primary coils L1a of the power supplying circuits M form an aggregation of close and adjacent primary coils L1a.

The control circuit 36 simultaneously outputs the synchronization signals PS1 and PS2 to each power supplying unit circuit M that is located immediately below the appliance E and outputs the excitation request signal RQ and the appliance authentication signal ID.

Accordingly, a plurality of the power supply unit circuits M cooperate to excite a plurality of the primary coils L1 and supply the single large appliance E with power.

Further, two or more appliances E requesting for power to be supplied may be set on the setting surface 6 of the power supplying device 1.

In this case, the power supplying unit circuit M corresponding to each of the primary coils L1a located immediately below each appliance E receives the excitation request signal RQ and appliance authentication signal ID of the corresponding appliance E and outputs the permission signal EN to the control circuit 36.

Based on the permission signal EN, to which a module identification signal is added, from each power supply unit circuit M, the control circuit 36 determines that there is not just one appliance E and determines that there are two or more appliances E set immediately above the primary coil L1a of each power supplying unit circuit M.

When there are two or more appliances E, it can be determined from the permission signal EN of each power supplying unit circuit M that the power supplying unit circuits M are spaced apart from each other.

The control circuit 36 outputs the synchronization signals PS1 and PS2 to each power supplying unit circuit M that is located immediately below the two or more set appliances E. Accordingly, the power supplying unit circuit M of each appliance E excites the corresponding primary coil L1 and supplies the appliance E with power.

Further, the control circuit 36 generates the synchronization signals PS1 and PS2 output to the excitation drive circuit 33 based on the clock signal CLK (refer to FIG. 6(c)) from the clock signal generation circuit 28. In other words, the control circuit 36 generates the synchronization signals PS1 and PS2, which are synchronized with the clock signal CLK and outputs the synchronization signals PS1 and PS2 to the excitation drive circuit 33. Accordingly, the synchronization signals PS1 and PS2, which have the same cycle, are output to each excitation drive circuit of the power supplying unit circuits M in the first group of the four primary coils L1a. As a result, the primary coils L1a in the first group have the same excitation frequency.

The clock signal generation circuit 28 includes an oscillation circuit, receives the power supply voltage VE from the external power supply 38 to oscillate the oscillation circuit, and generates the clock signal CLK shown in FIG. 6(c) based on the oscillation signal. The clock signal CLK generated by the clock signal generation circuit 28 is output to the control circuit 36 in the unit controllers 8a to 8d of each of the groups G1 to G4.

Accordingly, the synchronization signals PS1 and PS2 are output with the same cycle from the unit controllers 8a to 8d to the excitation drive circuit 33 arranged in each power supplying unit circuit M of each group. As a result, the primary coils L1a to L1d in each of the groups G1 to G4 have the same excitation frequency.

The operation of the power supplying device 1 will now be described.

When a power switch (not shown) is turned ON and the power supplying device 1 is supplied with power, power supply voltage VE is supplied from the external power supply 38 to the clock signal generation circuit 28 of the power supplying device 1 and the unit controllers 8a to 8d of each of the groups G1 to G4.

The clock signal generation circuit 28 generates the clock signal CLK based on the power supply voltage VE from the external power supply 38 and outputs the clock signal CLK to the unit controllers 8a to 8d of the groups G1 to G4.

The power supply circuits 35 of the unit controllers 8a to 8d each receive the power supply voltage VE from the external power supply 38. Further, the power supply circuits 35 of the unit controllers 8a to 8d convert the power supply voltage VE into the desired DC voltage and then output the DC voltage as drive power to the control circuits 36 of the unit controllers 8a to 8d and to the power supplying unit circuits M controlled by the unit controllers 8a to 8d.

When the external power supply 38 from the power supply circuit 35 is input and the clock signal CLK is input from the clock signal generation circuit 28, the control circuits 36 of the unit controllers 8a to 8d generate the synchronization signals PS1 to PS2. The control circuits 36 of the unit controllers 8a to 8d generate the synchronization signals PS1 and PS2 in synchronization with a common clock signal CLK. Thus, the synchronization signals PS1 and PS2, which are generated by the control circuits 36 of the unit controllers 8a to 8d, have the same cycle. The control circuits 36 of the unit controllers 8a to 8d output the generated synchronization signals PS1 and PS2 to the power supplying unit circuits M controlled by the unit controllers 8a to 8d.

Based on the synchronization signals PS1 and PS2, the power supplying unit circuits M controlled by the unit controllers 8a to 8d intermittently excite and drive the primary coils L1. In other words, the primary coils L1 (L1a to L1d) of the power supplying device 1 are all intermittently excited, and the power supplying device 1 shifts to a standby state and waits for the excitation request signal RQ and the appliance authentication signal ID from the appliance E.

Then, when the appliance E is set, the appliance E generates the appliance authentication signal ID and the excitation request signal RQ and transmits the appliance authentication signal ID and the excitation request signal RQ via the signal transmission antenna 9 to the signal reception antenna 7 of the power supplying unit circuit M located immediately below the appliance E.

The signal reception antenna 7 receives the appliance authentication signal ID and the excitation request signal RQ from the appliance E and extracts the appliance authentication signal ID and the excitation request signal RQ with the signal extraction circuit 32. The signal extraction circuit 32 outputs the permission signal EN to the control circuits 36 of the unit controllers 8a to 8d.

Based on the permission signal EN from the corresponding power supplying unit circuit M, the control circuit 36 of each of the unit controllers 8a to 8d recognizes that the appliance E is set immediately above the primary coil L1 of the power supplying unit circuit M and requesting for power to be supplied. Then, the control circuit 36 of each of the unit controllers 8a to 8d continuously output the synchronization signals PS1 and PS2 to the excitation drive circuit 33 of the power supplying unit circuit M. This starts continuous excitation of the primary coil L1 located where the appliance E is set.

When the appliance E is large, the primary coils L1a to L1d of each of the groups G1 to G4 may be located immediately below the appliance E. In this case, each power supplying unit circuit M corresponding to the primary coils L1a to L1d of each of the groups G1 to G4 located immediately below the appliance E outputs the permission signal EN to the control circuit 36 of the corresponding unit controllers 8a to 8d.

Then, the control circuits 36 of the unit controllers 8a to 8d output the synchronization signals PS1 and PS2 simultaneously to the power supplying unit circuits M of the primary coils L1a to L1d in each of the groups G1 to G4 located immediately below the set appliance E.

Accordingly, the power supplying unit circuits M of the groups G1 to G4 correspond to excite the primary coils L1a to L1d and supply power to the large single appliance.

In this state, the control circuits 36 of the unit controllers 8a to 8d generate the synchronization signals PS1 and PS2 in synchronization with the common clock signal CLK. Thus, the synchronization signals PS1 and PS2 generated by the control circuits 36 of the unit controllers 8a to 8d have the same cycle.

As a result, the primary coils L1a to L1d excited and driven by the excitation drive circuits 33 of the power supplying unit circuits M in the groups G1 to G4 have the same excitation frequency.

When the primary coils L1a to L1d of the groups G1 to G4 are continuously excited at the same excitation frequency, the appliance E is supplied with power in a contactless manner from the power supplying device 1 and drives the load Z with the secondary power.

When the appliance E is removed from the setting surface 6 or the excitation request signal RQ is cancelled and the permission signal EN is no longer output, the unit controllers 8a to 8d wait for a new permission signal EN from the power supplying unit circuits M. Further, the unit controllers 8a to 8d intermittently output the synchronization signals PS1 and PS2 to the power supplying unit circuits M. This intermittently excites and drives the primary coils L1. This is a standby state in which the power supplying device 1 waits for the excitation request signal RQ and appliance authentication signal ID from the appliance E.

The first embodiment has the advantages described below.

(1) In the power supplying device 1 of the present embodiment that includes the plurality of primary coils L1, the primary coils are divided into the first to fourth groups G1 to G4. One of the unit controllers 8a to 8d is arranged in each of the groups G1 to G4 to control all of the power supplying unit circuits M arranged in correspondence with the primary coils L1a to L1d of that group.

Further, the clock signal generation circuit 28 outputs a common clock signal CLK to the unit controllers 8a to 8d respectively arranged in the groups G1 to G4. The control circuits 36 of the unit controllers 8a to 8d generate the synchronization signals PS1 and PS2 that excite the primary coils L1a to L1d based on the common clock signal CLK. The synchronization signals PS1 and PS2 are output to the power supplying unit circuits M in each of the groups G1 to G4. The synchronization signals PS1 and PS2 are rectangular wave pulse signals having the same cycle. Thus, the primary coils L1a to L1d of the groups G1 to G4 have the same excitation frequency.

Accordingly, the appliance E is supplied with power in a contactless manner from the power supplying device 1 in a state in which the primary coils L1a to L1d are excited and driven by the same excitation frequency.

As a result, variations are reduced in the secondary power supplied to the secondary coil L2 that would be caused by variations in the excitation frequency of the primary coils L1a to L1d. Thus, stable secondary power can be supplied.

(2) In the present embodiment, the primary coils L1a to L1d of the groups G1 to G4 in the power supplying device 1 have the same excitation frequency. Accordingly, to stabilize the secondary power, an expensive and large smoothing capacitor having a large capacitance does not have to be arranged in the appliance E, and a constant voltage power supply circuit such as a three-terminal regulator having a large power loss during rectification does not have to be used.

(3) In the present embodiment, the power supply circuits 35 are arranged in the unit controllers 8a to 8d of the groups G1 to F4. Accordingly, the power supply circuit 35 of each group only needs to supply drive power to the power supplying unit circuits M in the corresponding group. This reduces the load and allows for reduction in the circuit scale.

In the present embodiment, sixteen primary coils L1 are arranged in the power supplying device 1. However, there is no such limitation, and the power supplying device 1 may include any number of primary coils L1, such as twenty, forty, forty-eight, and fifty.

In the present embodiment, there are four groups G1 to G4. However, there may be any number of groups other than four. In this case, greater effects can be obtained when the number of groups is larger.

In the present embodiment, each group is formed by four primary coils L1. However, there is no limitation to four, and there may be any number of primary coils other than four in each group. In this case, greater effects can be obtained when the number of primary coils L1 in each group is larger. Further, greater effects can be obtained when the number of groups is larger.

In the present embodiment, each primary coil L1 of the power supplying device 1 is arranged on the top plate 5 of the single frame 2, and the primary coils L1 arranged on the single frame 2 (top plate 5) is divided into the groups G1 to G4. Instead, each group may be formed by a single body that can be divided into separate parts, and the groups of single bodies may be joined with one another to form the power supplying device 1. In this case, a single clock signal generation circuit 28 is arranged in one of the single bodies, and the clock signal CLK generated by the clock signal generation circuit 28 is required to be output to unit controllers 8a to 8d of each single body.

In this structure, when the power supplying device 1 is arranged over a wide area, such as a floor or a wall, the groups of single bodies can be joined together in accordance with size. This obtains a single inexpensive power supplying device 1 in which the primary coils L1 have the same excitation frequency.

Needless to say, a clock signal generation circuit 28 may be provided in advance for each of the single bodies. When the groups of single bodies are joined to form a single power supplying device 1, one of the clock signal generation circuits 28 are selected, and the clock signal CLK of the selected clock signal generation circuit 28 may be output to the unit controllers 8a to 8d of the single bodies.

(Second Embodiment)

A second embodiment will now be described with reference to FIG. 7.

The first embodiment includes the clock signal generation circuit 28 that outputs the clock signal CLK to the unit controllers 8a to 8d of each set. In contrast, the clock signal generation circuit 28 is omitted in the present embodiment. The feature of the present embodiment is in that the control circuit 36 in the unit controller 8a of one group, for example, the first group G1, generates the clock signal CLK.

The features of the present embodiment will now be described in detail, and components that are similar to those of the first embodiment will not be described.

Figure 7:
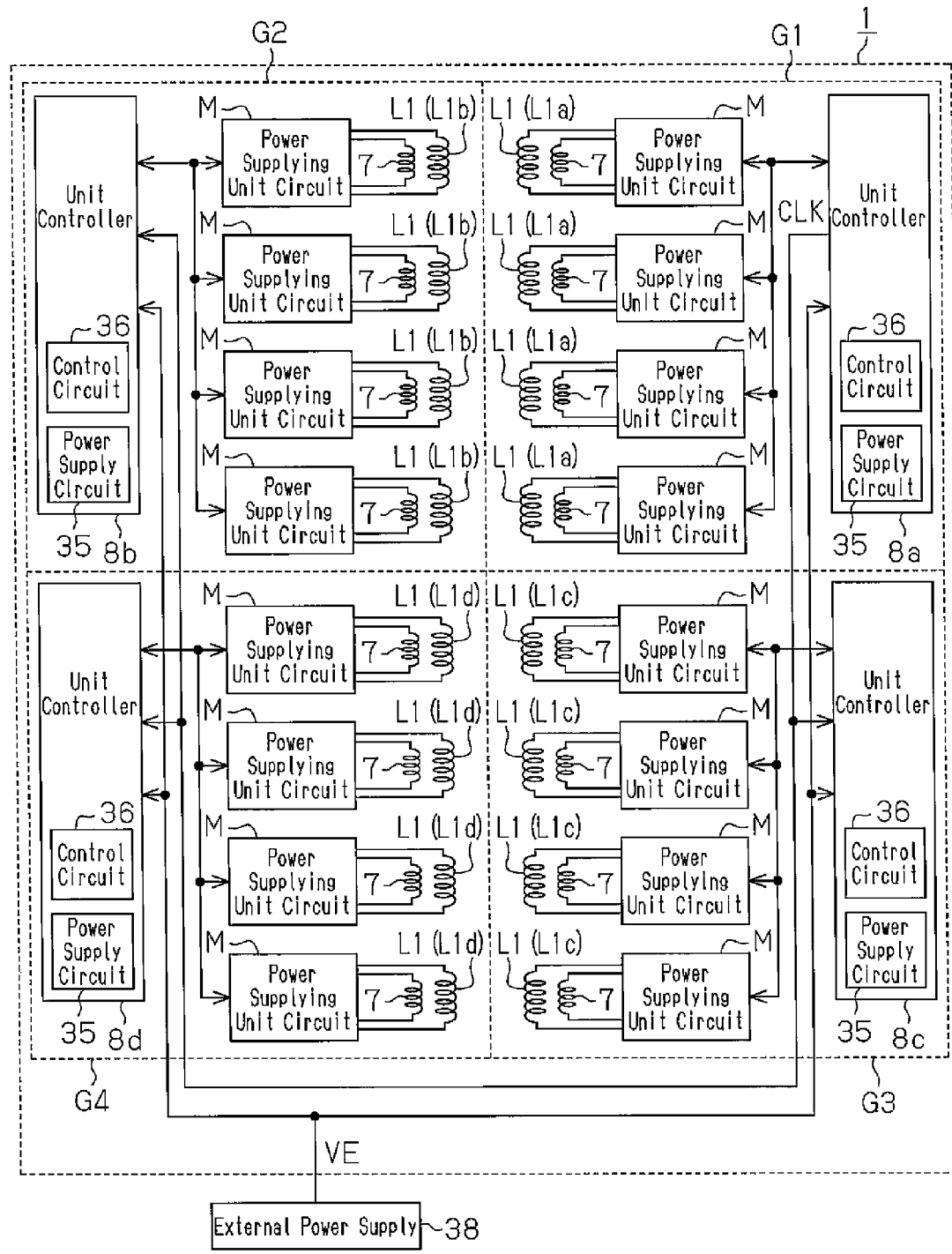
FIG. 7 is an electric circuit diagram showing the electric configuration of a power supplying device of a second embodiment.

In FIG. 7, the control circuit 36 of the unit controller 8a in the first group G1 includes an oscillation circuit that is similar to the oscillation circuit of the clock signal generation circuit 28 in the first embodiment. The oscillation circuit oscillates when receiving the power supply voltage VE from the external power supply 38 and generates the clock signal CLK based on the oscillation signal. Further, the oscillation circuit generates the clock signal CLK based on the oscillation signal. Based on the generated clock signal CLK, the control circuit 36 generates the synchronization signals PS1 and PS2 for its unit controller 8a.

The control circuit 36 of the unit controller 8a outputs the generated clock signal CLK to the control circuits 36 in the unit controllers 8b to 8d of the other groups G2 to G4. The control circuits 36 arranged in the unit controllers 8b to 8d are similar to those arranged in the first embodiment and generate the synchronization signals PS1 and PS2 based on the input clock signal CLK.

Accordingly, the unit controllers 8a to 8d output the synchronization signals PS1 and PS2, which have the same cycle, to the excitation drive circuit 33 arranged in each power supplying unit circuit M of the first to fourth groups G1 to G4. As a result, the primary coils L1 (L1a to L1d) of the power supplying device 1 all have the same excitation frequency.

The present embodiment has the same advantages as the first embodiment.

In the present embodiment, the unit controller 8a of the first group G1 generates the clock signal CLK. However, there is no such limitation, and the clock signal CLK may be generated by the control circuit 36 of one of the other unit controllers 8b to 8d.

Further, like the first embodiment, in the present embodiment, each primary coil L1 of the power supplying device 1 is arranged on the top plate 5 of the single frame 2, and the primary coils L1 arranged on the single frame 2 (top plate 5) is divided into the groups G1 to G4. Instead, each group may be formed by a single body that can be divided into separate parts, and the groups of single bodies may be joined with one another to form the power supplying device 1.

In this structure, when the power supplying device 1 is arranged over a wide area, such as a floor or a wall, the single bodies can be joined together in accordance with size. This obtains a single inexpensive power supplying device 1 in which the primary coils L1 have the same excitation frequency.

Further, like the first embodiment, it is obvious that the number of primary coils L1, the number of groups, and the number of the primary coils L1 in each group may be changed in the present embodiment.

(Third Embodiment)

A third embodiment will now be described with reference to FIG. 8.

In the second embodiment, the control circuit 36 of one group generates the clock signal CLK. The feature of the present embodiment is in that the clock signal CLK is generated in the control circuit 36 of each of the unit controllers 8a to 8d to generate the synchronization signals PS1 and PS2.

The features of the present embodiment will now be described in detail, and components that are similar to those of the second embodiment will not be described.

Figure 8:
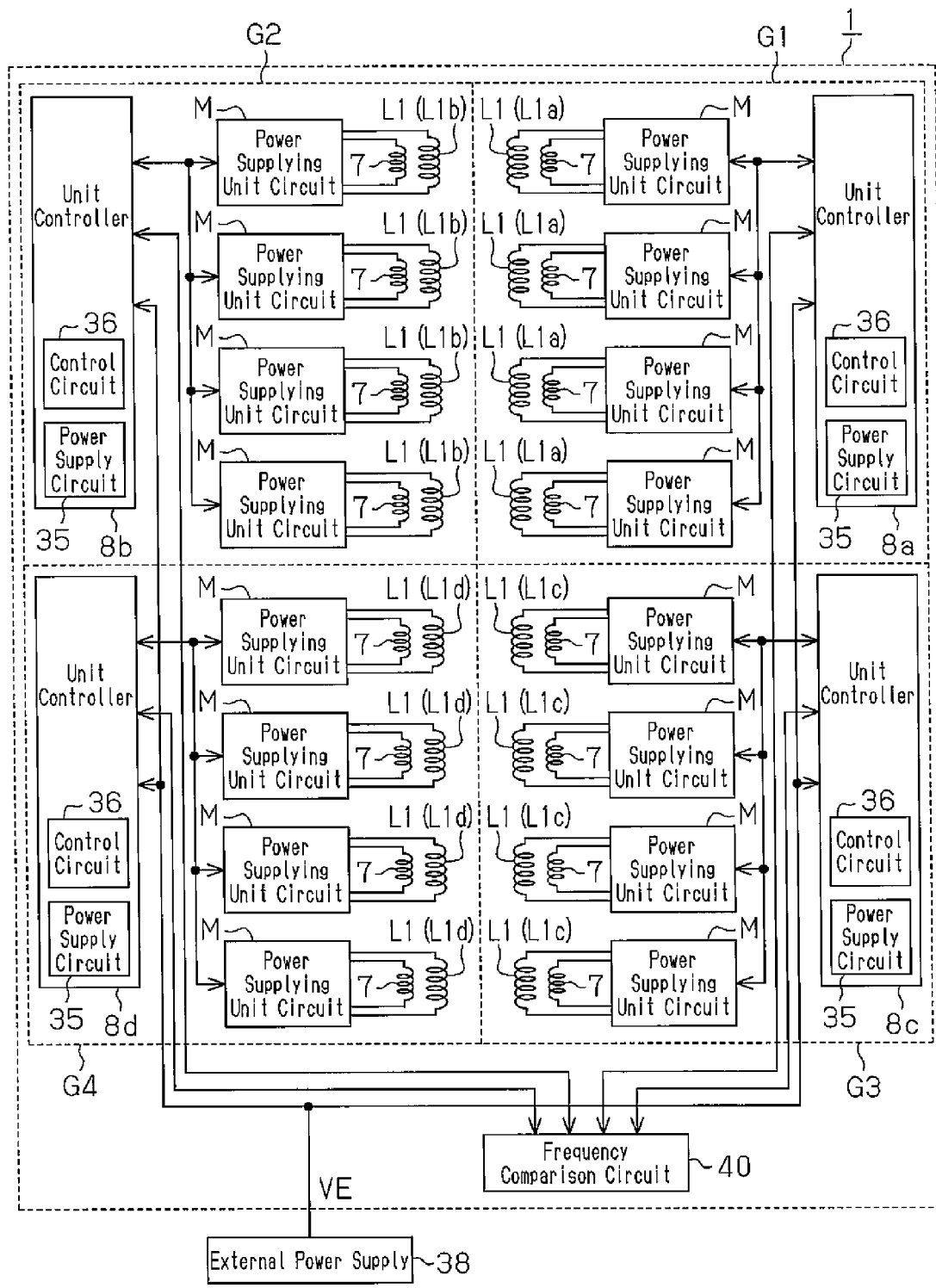
FIG. 8 is an electric circuit diagram showing the electric configuration of a power supplying device of a third embodiment.

Referring to FIG. 8, the control circuits 36 arranged in the unit controllers 8a to 8d of the groups G1 to G4 receive the power supply voltage from the external power supply 38 in the same manner as the control circuit 36 of the unit controller 8a in the second embodiment. The control circuits 36 of the unit controllers 8a to 8d generate clock signals CLKa to CLKd as shown in FIGS. 10(a), 10(d), 10(g), and 10(j), respectively. The control circuits 36 of the unit controllers 8a to 8d generate one of the synchronization signals PS1a to PS1d as shown in FIGS. 10(b), 10(e), 10(h), and 10(k) based on the clock signals CLKa to CLKd. Further, like the above embodiment, the control circuits 36 of the unit controllers 8a to 8d generate the other one of the synchronization signals PS2a to PS2d as shown in FIGS. 10(c), 10(f), 10(i), and 10(l) based on synchronization signals PS1a to PS1d.

The control circuits 36 of the unit controllers 8a to 8d output one of the synchronization signals PS1a to PS1d, which they generate, to a frequency comparison circuit 40.

To facilitate description, one of the synchronization signals PS1a generated by the unit controller 8a and output to the frequency comparison circuit 40 is referred to as "the reference clock signal PS1a." One of the synchronization signals PS1b to PS1d generated by the other unit controllers 8b to 8d and output to the frequency comparison circuit 40 are referred to as "the control clock signals PS1b to PS1d."

The reference clock signal PS1a is a clock signal of which frequency is used as a reference for other control clock signals PS1b to PS1d. The control clock signals PS1b to PS1d are clock signals of which frequencies are adjusted to the frequency of the reference clock signal PS1a.

Figure 9:
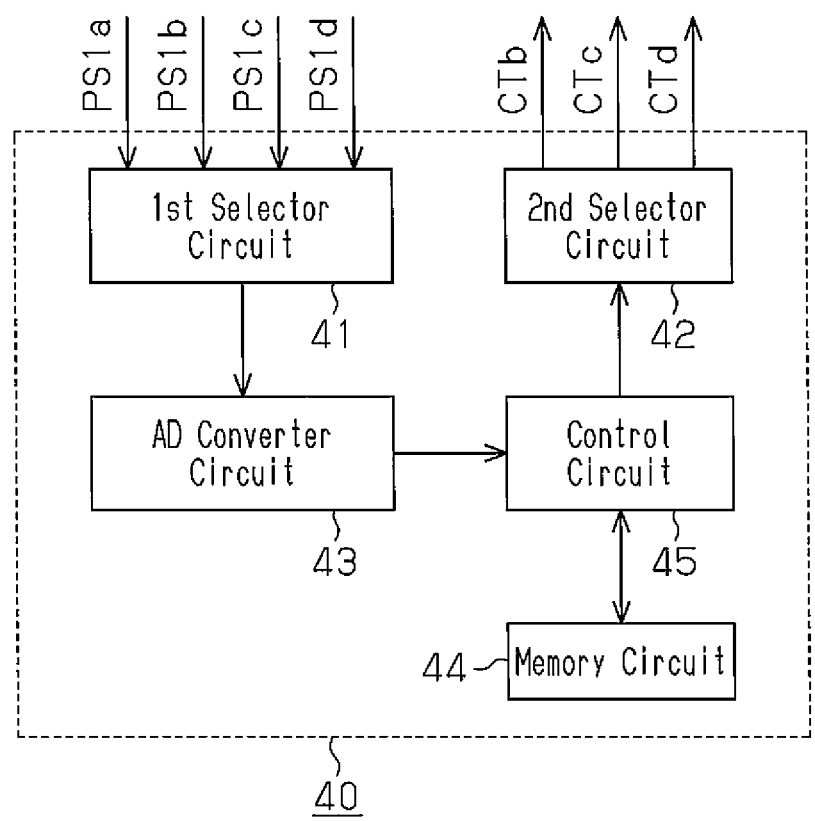
FIG. 9 is an electric block circuit diagram of a frequency comparison circuit.

As shown in FIG. 9, the frequency comparison circuit 40 arranged in the power supplying device 1 includes first and second selector circuits 41 and 42, an AD converter circuit 43, a memory circuit 44, and a control circuit 45, which is formed by a microcomputer that controls all of the circuits 41 to 44.

The first selector circuit 41 receives the reference clock signal PS1*a* and the control clock signals PS1*b* to PS1*d*. Under the control of the control circuit 45, the first selector circuit 41 sequentially selects and input during a fixed period the reference clock signal PS1*a*→the control clock signal PS1*b*→the control clock signal PS1*c*→the control signal PS1*d* and then repeats this process. The first selector circuit 41 outputs the sequentially input reference clock signal PS1*a* and the control clock signals PS1*b* to PS1*d* to an AD converter circuit 43.

The AD converter circuit 43 incorporates a sampling circuit and samples the sequentially input reference clock signal PS1*a* and the control clock signals PS1*b* to PS1*d*.

Figure 10:
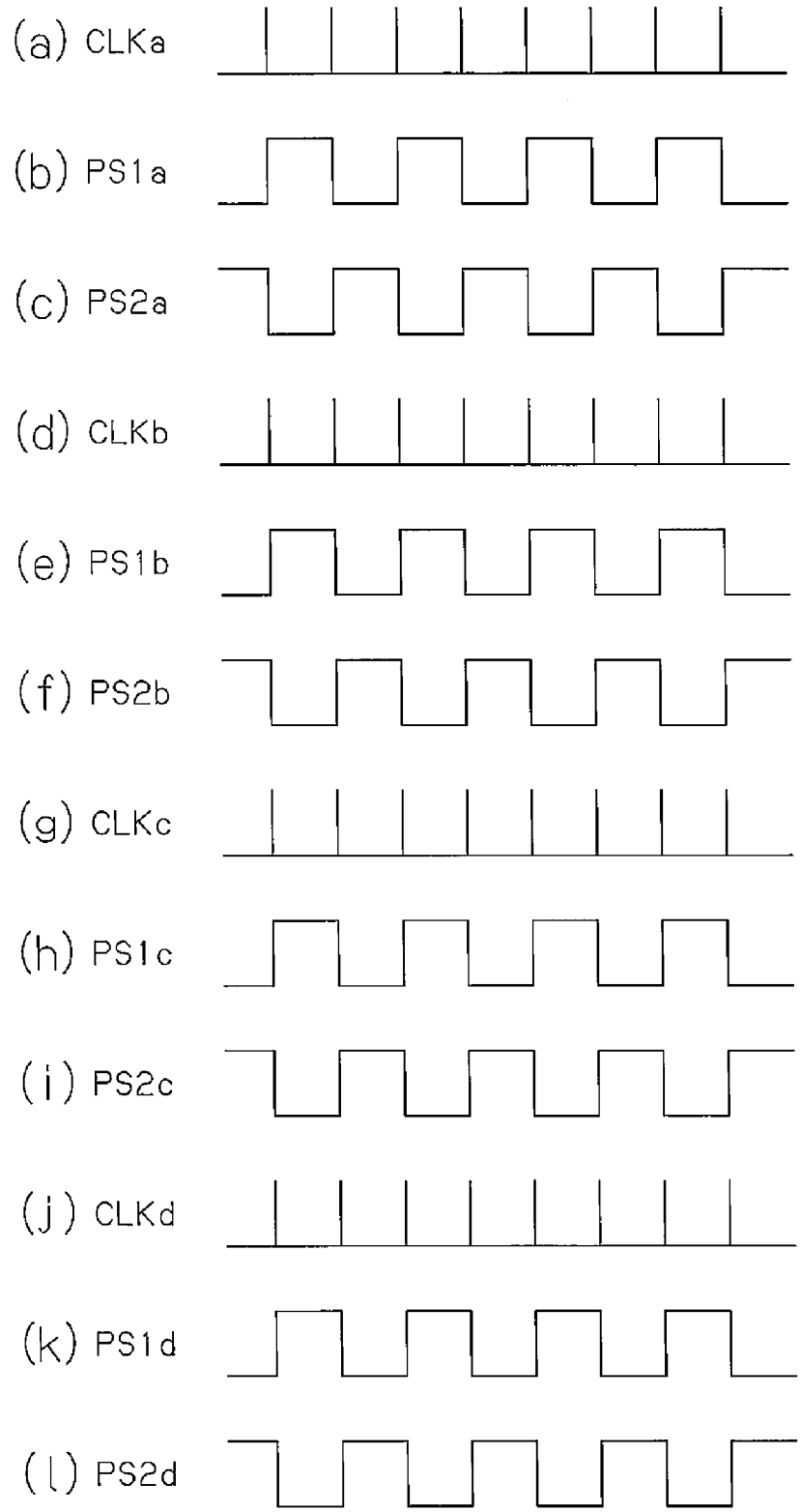
FIGS. 10(a), 10(b), and 10(c) are waveform charts of a first group of a clock signal, one synchronization signal, and the other synchronization signal.
FIGS. 10(d), 10(e), and 10(f) are waveform charts of a second group of a clock signal, one synchronization signal, and the other synchronization signal.
FIGS. 10(g), 10(h), and 10(i) are waveform charts of a third group of a clock signal, one synchronization signal, and the other synchronization signal.
FIGS. 10(j), 10(k), and 10(l) are waveform charts of a fourth group of a clock signal, one synchronization signal, and the other synchronization signal.

The AD converter circuit 43 samples the reference clock signal PS1*a*, which is a rectangular wave pulse signal as shown in FIG. 10, in extremely short cycles. Here, the control circuit 45 obtains the sampled number of high potentials (high levels) and low potentials (low levels) in the reference clock signal PS1*a* (rectangular wave pulse signal). The control circuit 45 calculates the frequency of the reference clock signal PS1*a* from these obtained sampling numbers.

The control circuit 45 temporarily stores the calculated frequency of the reference clock signal PS1*a* in a memory circuit 44 formed by a rewritable EEPRPMO. Here, the frequency of the reference clock signal PS1*a* calculated in a preceding calculation process and stored in the memory circuit 44 is updated to the frequency of the new reference clock signal PS1*a*.

Subsequently, in the same manner, the AD converter circuit 43 performs sampling on the control clock signals PS1 to PS1*d*, the control circuit 45 obtains the sampled number of the control clock signals PS1*b* to PS1*d*, and sequentially calculates the frequencies of the control clock signals PS1*b* to PS1*d*.

When the frequencies of the control clock signals PS1*b* to PS1*d* are sequentially calculated, the control circuit 45 sequentially compares the frequencies of the control clock signals PS1*b* to PS1*d* with the frequency of the reference clock signal PS1*a* stored in the memory circuit 44.

When the frequency of the reference clock signal PS1*a* differs from the frequencies of the reference clock signals PS1*b* to PS1*d*, the control circuit 45 executes a process for adjusting the differing frequencies of the control clock signals PS1*b* to PS1*d* to the frequency of the reference clock signal PS1*a*.

In detail, for example, when the frequency of the control clock signal PS1*b* differs from the frequency of the reference clock signal PS1*a*, a control signal CTb is generated to adjust the frequency of the control clock signal PS1*b* to the frequency of the reference clock signal PS1*a*.

The control clock signal (synchronization signal) PS1*b* is generated in synchronism with the clock signal CLKb generated by the control circuit 36 in the unit controller 8*b*. Thus, the control signal CTb is a control signal that adjusts the cycle of the clock signal CLKb generated by the control circuit 36 of the unit controller 8*b*. The control value of the control signal CTb for a different frequency is obtained in advance and stored in the memory of the control circuit 45.

After generating a control signal CTb for the control clock signal (synchronization signal) PS1*b* of the unit controller 8*b*, the control circuit 45 controls the second selector circuit 42 and connects to the unit controller 8*b* to output the control signal CTb to the unit controller 8*b*. Further, the unit controller 8*b*, which receives the control signal CTb, adjusts, in the control circuit 36, the frequency of the clock signal CLKb to be the same as the frequency of the clock signal CLKa in the unit controller 8*a* based on the value of the control signal CTb.

Accordingly, the unit controller 8*b* adjusts, in the control circuit 36, the frequency of the synchronization signal PS1*b* (synchronization signal PS2*b*) to be the same as the frequency of the synchronization signal PS1*a* (synchronization signal PS2*a*). As a result, the primary coils L1*a* and L1*b* of the first group G1 and the second group G2 have the same excitation frequency.

The unit controller 8*b* outputs the adjusted synchronization signal PS1*b* as a new control clock signal PS1*b* to the frequency comparison circuit 40. Accordingly, the new control clock signal PS1*b* is used to perform a new comparison process.

In the same manner, the control clock signals PS1*c* and PS1*d* of the other unit controllers 8*c* and 8*d* are compared with the reference clock signal PS1*a*. When the frequencies are different, the control circuit 45 outputs the control signals CTc and CTd to the unit controllers 8*c* and 8*d* and adjusts the frequencies of the synchronization signals PS1*c* and PS1*d*.

Accordingly, the primary coils L1 (L1*a* to L1*d*) of the power supplying device 1 all have the same excitation frequency.

The present embodiment has the same advantages as the first embodiment.

In the third embodiment, the frequency of the reference clock signal (synchronization signal) PS1*a* and the frequencies of the control clock signals (synchronization signals) PS1*b* to PS1*d* are compared and sampled to calculate and compare the frequencies.

The rising edges and falling edges of the reference clock signal (synchronization signal) PS1*a* and the control clock signals (synchronization signals) PS1*b* to PS1*d* may be obtained. Then, the time between the rising edge and corresponding falling edge may be measured to obtain the frequency.

Further, the frequency comparison circuit 40 may be replaced by, for example, a PLL synthesizer so that the control clock signals (synchronization signals) PS1*b* to PS1*d* have the same frequency as the reference clock signal (synchronization signal) PS1*a*.

In the same manner as the first embodiment, the present embodiment arranges each primary coil L1 of the power supplying device 1 on the top plate 5 of the single frame 2 and divides the primary coils L1 arranged on the single frame 2 (top plate 5) into groups G1 to G4. Instead, each group may be formed by a single body that can be divided into separate parts, and the groups of single bodies may be joined with one another to form the power supplying device 1. In this case, the frequency comparison circuit 40 is arranged in one of the frequency bodies, and the frequency comparison circuit 40 compares the frequencies of the reference clock signal (synchronization signal) PS1*a* and control clock signals (synchronization signals) PS1*b* to PS1*d* of the unit controllers 8*a* to 8*d* in the single bodies. Then, the frequency comparison circuit 40 is required to output the control signals CTb to CTd based on the comparison result to the unit controllers 8*b* to 8*d* of the single bodies.

In this structure, when the power supplying device 1 is arranged over a wide area, such as a floor or a wall, the single bodies can be joined together in accordance with size. This obtains a single inexpensive power supplying device 1 in which the primary coils L1 have the same excitation frequency.

Needless to say, the frequency comparison circuit 40 may be arranged in advance in each of the single bodies. In this case, when joining the single bodies to form a single power supplying device 1, one of the frequency comparison circuits 40 is selected. The selected frequency comparison circuit 40 compares the frequencies of the reference clock signal (synchronization signal) PS1a and the control clock signals (synchronization signals) PS1b to PS1d. Then, the frequency comparison circuit 40 is required to output the control signals CTb to CTd based on the comparison result to the unit controllers 8b to 8d of the single bodies.

Further, like the first embodiment, it is obvious that the number of primary coils L1, the number of groups, and the number of the primary coils L1 in each group may be changed in the present embodiment.

In each embodiment, the excitation drive circuit 33, which is arranged in the power supplying unit circuit M, is formed by a half-bridge circuit including two switching transistors. However, there is no such limitation, and the excitation drive circuit 33 may be formed by a full-bridge circuit including four switching transistors.

In each of the above embodiments, the power supplying device 1 includes the signal reception antenna 7 for each primary coil L1 and the signal transmission antenna 9 in the appliance E, and signals are exchanged between the signal transmission antenna 9 and the corresponding signal reception antenna 7.

However, the signal reception antenna 7 arranged in each primary coil L1 of the power supplying device 1 may be omitted, and the primary coils L1 may be used as the signal reception antenna 7. Further, the signal transmission antenna 9 of the appliance E may be omitted, and the secondary coil L2 may be used as the signal transmission antenna 9.

In this case, the transmission circuit 24 of the appliance E is connected to the secondary coil L2, and the appliance authentication signal ID and excitation request signal RQ generated by the data generation circuit 23 is transmitted via the secondary coil L2 to the primary coil L1 of the power supplying device 1. The reception circuit 31 of the power supplying device 1 is connected to the primary coil L1 and receives the appliance authentication signal ID and excitation request signal RQ received by the primary coil L1 from the appliance E.

By omitting the signal transmission antenna 9 and the signal reception antennas 7 in this manner, costs can be reduced and miniaturization can be achieved.

Further, the signal reception antenna arranged in each primary coil L1 of the power supplying device 1 may be omitted and each primary coil L1 may be used as the signal reception antenna 7 to use the appliance E in the same manner as the above embodiments.

In contrast, it is obvious that the signal transmission antenna 9 of the appliance E may be omitted and the secondary coil L2 may be used as the signal transmission antenna 9 using the power supplying device 1 in the same manner as the above embodiment.

In one embodiment, a method for exciting a primary coil in a contactless power supplying device that includes a plurality of primary coils (L1a to L1d) and a plurality of power supplying unit circuits (M) respectively exciting the primary coils, wherein the contactless power supplying device uses an electromagnetic induction effect to supply power to a power reception device opposed to at least one of the primary coils, wherein the method includes dividing the plurality of primary coils into a plurality of groups of the primary coils, providing a synchronization signal to a power supplying unit circuit in each group of a plurality of groups of power supplying unit circuits respectively corresponding to the plurality of groups of the primary coils, wherein the providing synchronization signals includes providing the plurality of groups of power supplying unit circuits with synchronization signals that have the same frequency to excite and drive the plurality of groups of primary coils with the same frequency.

Further, in one embodiment, a contactless power supplying device includes a plurality of groups of primary coils (L1a to L1d) and a plurality of groups of power supplying unit circuits (M) that respectively excite the plurality of groups of primary coils, wherein the contactless power supplying device uses an electromagnetic induction effect to supply power to a power reception device (E) opposed to at least one primary coil among the plurality of groups of primary coils, the contactless power supplying device includes a plurality of unit controllers (8a to 8d) that respectively provide the plurality of groups of power supplying unit with synchronization signals, wherein the synchronization signals generated by the plurality of unit controllers have the same frequency.

The contactless power supplying device may include a clock signal generation circuit (28) connected to the plurality of unit controllers to provide each of the plurality of unit controllers with a common clock signal used by the plurality of unit controllers to generate the synchronization signals that have the same frequency.

Further, one of the plurality of unit controllers may include a clock signal generation circuit, and the other unit controllers may be provided with a clock signal generated by the clock signal generation circuit.

In one embodiment, a contactless power supplying device includes a plurality of groups of primary coils (L1a to L1d) and a plurality of groups of power supplying unit circuits (M) that respectively excite the plurality of groups of primary coils, wherein the contactless power supplying device uses an electromagnetic induction effect to supply power to a power reception device (E) opposed to at least one primary coil among the plurality of groups of primary coils, the contactless power supplying device includes a plurality of unit controllers (8a to 8d) that respectively provide the plurality of groups of power supplying unit with synchronization signals, and a frequency comparison circuit (40) that provides a plurality of controls signals respectively to the plurality of unit controllers so that the plurality of synchronization signals have the same frequency.

The frequency comparison circuit may include a sampling circuit (43), which samples the plurality of synchronization signals generated by the plurality of unit controllers, and a control circuit (45), which calculates the frequency of each of the plurality of synchronization signals generated by the plurality of unit controllers based on a sampling signal sampled by the sampling circuit, uses the calculated frequency of one of the plurality of synchronization signals as a reference, and provides a control signal to the unit controllers corresponding to the remaining synchronization signals so that the remaining synchronization signals are generated to have frequencies that conform to the frequency of the one of the plurality of synchronization signals.

The invention claimed is:

1. A method for exciting a primary coil in a contactless power supplying device that includes a plurality of primary coils and a plurality of power supplying unit circuits respectively exciting the plurality of primary coils, wherein the contactless power supplying device uses an electromagnetic induction effect to supply power to a power reception device opposed to at least one of the primary coils, the method comprising:
dividing the plurality of primary coils into a plurality of groups of primary coils;
providing synchronization signals to power supplying circuits in each group among a plurality of groups of power supplying unit circuits respectively corresponding to the plurality of groups of primary coils;

calculating a frequency of each of the plurality of synchronization signals;

comparing the calculated frequencies of the plurality of synchronization signals and a frequency of a reference clock signal; and when the calculated frequencies of the plurality of synchronization signals differ from the frequency of the reference clock signal, adjusting the differing frequencies of the plurality of synchronization signals to the frequency of the reference clock signal.

2. A contactless power supplying device including
a plurality of groups of primary coils, and
a plurality of groups of power supplying unit circuits that respectively excite the plurality of groups of primary coils, wherein the contactless power supplying device uses an electromagnetic induction effect to supply power to a power reception device opposed to at least one of the primary coils among the plurality of groups of primary coils, the contactless power supplying device comprising:
a plurality of unit controllers that respectively provide synchronization signals to the plurality of groups of power supplying units; and
a control circuit connected to the plurality of unit controllers, wherein the control circuit calculates a frequency of each of the plurality of synchronization signals generated by the plurality of unit controllers and compares the calculated frequencies of the plurality of synchronization signals and a frequency of a reference clock signal, wherein when the calculated frequencies of the plurality of synchronization signals differ from the frequency of the reference clock signal, the control circuit adjusts the differing frequencies of the plurality of synchronization signals to the frequency of the reference clock signal.

3. A contactless power supplying device including
a plurality of groups of primary coils, and
a plurality of groups of power supplying unit circuits that respectively excite the plurality of groups of primary coils, wherein the contactless power supplying device uses an electromagnetic induction effect to supply power to a power reception device opposed to at least one of the primary coils among the plurality of groups of primary coils, the contactless power supplying device comprising:
a plurality of unit controllers that respectively provide synchronization signals to the plurality of groups of power supplying units; and
a frequency comparison circuit connected to the plurality of unit controllers, wherein the frequency comparison circuit compares frequencies of the plurality of synchronization signals generated by the plurality of unit controllers and provides a plurality of control signals to the plurality of unit controllers so that the plurality of synchronization signals have the same frequency, wherein the frequency comparison circuit includes
a sampling circuit that samples the plurality of synchronization signals generated by the plurality of unit controllers, and
a control circuit connected to the sampling circuit, wherein the control calculates the frequency of each of the plurality of synchronization signals generated by the plurality of unit controllers based on a sampling signal sampled by the sampling circuit, uses the calculated frequency of one synchronization signal among the plurality of synchronization signals as a reference, and provides the unit controllers corresponding to the remaining synchronization signals with a control signal so that the remaining synchronization signals are generated with frequencies that conform to the one synchronization signal.

* * * * *